United States Patent [19]
Soma

[11] 3,827,385
[45] Aug. 6, 1974

[54] CARGO VESSEL

[75] Inventor: Hisashi Soma, Yokohamashi, Japan

[73] Assignee: Mitsui Shipbuilding and Engineering Co. Ltd., Tokyo, Japan

[22] Filed: Nov. 2, 1972

[21] Appl. No.: 303,201

[30] Foreign Application Priority Data
Nov. 2, 1971   Japan.............................. 46-87340

[52] U.S. Cl..................................... 114/85, 14/71
[51] Int. Cl............................................ B63b 3/48
[58] Field of Search.............. 114/72, 85, 76; 14/71

[56] References Cited
UNITED STATES PATENTS

| | | | |
|---|---|---|---|
| 1,815,687 | 7/1931 | Watts.................................. | 114/72 |
| 2,637,453 | 5/1963 | Cleveland............................ | 114/72 |
| 2,979,007 | 4/1961 | Kummerman........................ | 14/71 |
| 3,059,606 | 10/1962 | Downham et al.................... | 114/72 |
| 3,302,339 | 2/1967 | White.................................. | 14/71 |
| 3,387,581 | 6/1968 | Suganuma........................... | 114/72 |

FOREIGN PATENTS OR APPLICATIONS
659,827   2/1965   Belgium................................ 14/71

279,158   11/1964   Netherlands........................... 14/71

*Primary Examiner*—George E. Halvosa
*Assistant Examiner*—Edward R. Kazenske
*Attorney, Agent, or Firm*—Dorfman, Herrell and Skillman

[57] ABSTRACT

A cargo vessel in which the tweendecks are displacable vertically, being lifted to clear the hold for bulk cargo. Ramps are provided which are operable when the tweendecks are lowered to permit passage vehicles through an opening in the upper deck down the ramp to the next lower deck. The ramp is hingedly supported at one end at the upper deck at one end of the opening. The other end of the ramp is slidably supported on the lower deck so that when the lower deck is raised, it raises that end of the ramp into the opening. That end of the ramp is provided with a subramp which has limited pivotal movement relative to the main ramp and a foldable extension at the free end which may be folded back over the subramp.

1 Claim, 5 Drawing Figures

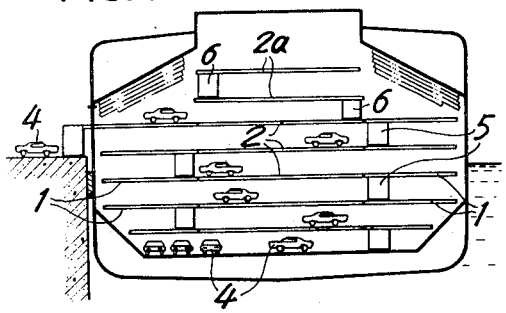
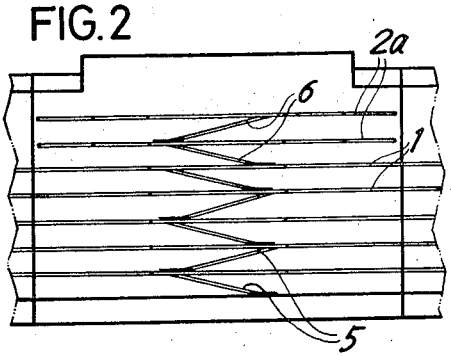
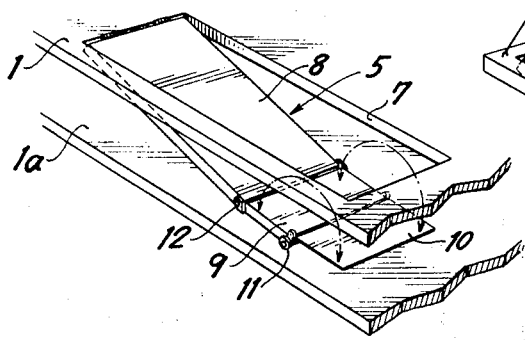
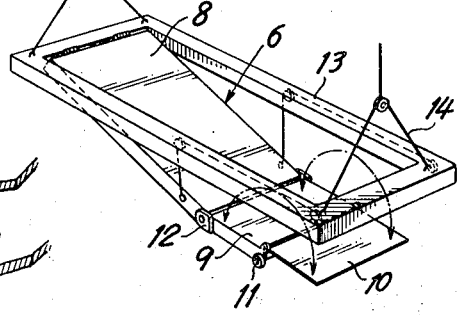
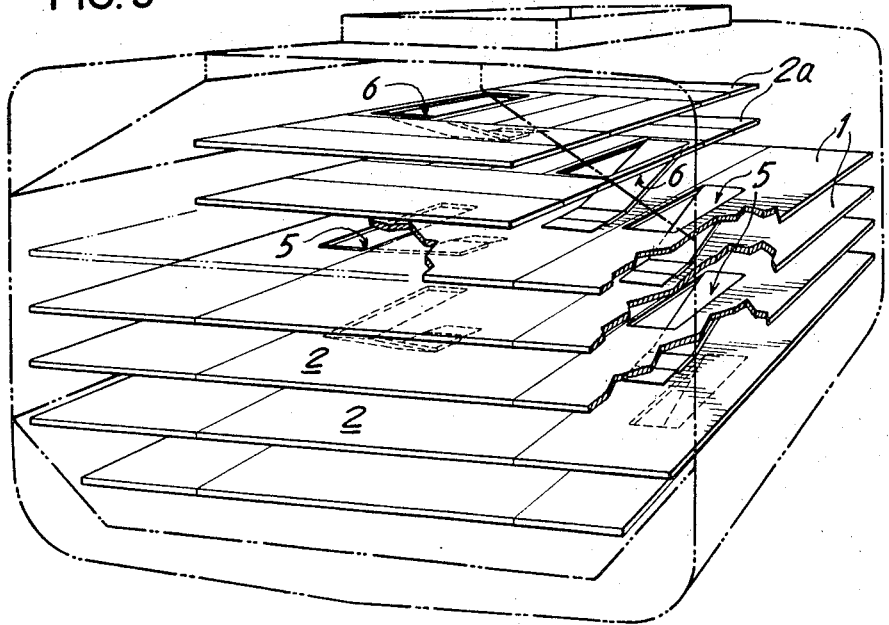

CARGO VESSEL

The present invention relates to a cargo vessel of which hold is convertible to the hold for loading automobiles, and more particularly to apparatus for loading automobiles.

In the prior art, when automobiles are loaded, detachable tweendeck floor panels are disposed in the hold and automobiles are suspended by crane and lowered on the tweendeck floor panels or unloaded from the hold by the crane. According to this conventional apparatus, it takes long time to load and unload automobiles.

It is accordingly an object of the present invention to provide a cargo vessel whereby the time of the automobile loading and unloading working may be reduced and to provide a cargo vessel also for the transport of automobiles in the roll-on and roll-off system in which the automobiles can self-run from a quay into the hold.

The cargo vessel according to the present invention is characterized in that detachable tweendecks are provided with ramp ways and portable ramp ways which can be automatically let down and replaced in the tweendeck to facilitate suspension and storage of the decks.

In the drawings,

FIG. 1 is a cross-sectional view of a cargo vessel in which the present invention is embodied;

FIG. 2 is a longitudinal-sectional view of the cargo vessel shown in FIG. 1;

FIG. 3 is a perspective view showing ramp way;

FIG. 4 is a perspective view showing a ramp way unit; and

FIG. 5 is a perspective view showing the essential portion of the cargo vessel in which the present invention is embodied.

In FIG. 1, detachable tweendecks 1 provided with hinged ramp ways 5 are releasably supported at the sides of the hold, in a conventional manner to be raised and lowered detachable pontoon type decks 2 are supported at the central part. In the detachable decks 2a provided in the upper portion of the hold, hinged ramp way units 6 are provided. Although the ramp ways are disposed in staggered relation as shown in FIG. 1, they may also be provided on only one broadside.

A car ladder as well as a side port or others with which automibiles 4 can self-run to go between a quay and the hold of the cargo are provided, whereby the automobiles 4 can be easily loaded and unloaded.

The hinged ramp way 5 will now be explained. As shown in FIG. 3, an opening 7 is provided in the detachable tweendeck 1. On one side of the opening, a main ramp way 8 is rotatably mounted by a hinge. Further, a sub-ramp way 9 is rotatably provided on the end of the main ramp way. Rollers 11 are provided at the lower part of the end of the sub-ramp way. Further, a flap 10 is mounted on the end of the sub-ramp way. The sub-ramp way 9 is coupled by the hinge 12 to the main ramp way 8 so as to be prevented from turning beyond a predetermined angle. Thus, the automobile can smoothly run on the ramp way.

When the deck 1 is to be stored, the flap 10 is folded on the sub-ramp way 9, and the lower tweendeck 1a is suspended and lifted. The ramp ways 8 and 9 of the tweendick 1 are thereby raised as the rollers 11 are rotated on the tweendeck 1a, and thus the ramp ways are automatically restored in the opening 7. On the other hand, when the tweendecks 1 and 1a are set, the lower tweendeck 1a is lowered, thereby the ramp way is set automatically.

The hinged ramp way unit 6 is set between the adjacent decks 2. As illustrated in FIG. 5, it is composed of similar components to those of the hinged ramp way 5 shown in FIG. 3. More specifically, a detachable deck portion or frame for ramp way 13 is disposed between the pontoon type decks 2a, and ramp ways 8 and 9, the flap 10 and rollers 11 are attached thereto as in the ramp way 5. Further, a wire 14 for suspending the ramp way 8 is connected. The ramp ways 8, 9 are lifted and restored in the ramp way frame 13 by the wire 14. The ramp way unit 6 is suspended by wires 14 and 14a and stored on the upper deck together with the frame 13. By loosening the wire 14, the ramp ways 8 and 9 are set by their own weights.

As apparent from the foregoing, in accordance with the present invention, the self-running system of cargo-working for automobiles is enabled, the cargo-working time is shortened.

What is claimed is:

1. Cargo vessel having a series of detachable tweendecks for carrying automobiles characterized in that the each detachable tweendeck is displaceable vertically by lifting and lowering, and including at least one ramp extending from an opening in an upper tweendeck to the next lower tweendeck, the ramp being hinged to the upper tweendeck at one end of the opening, and being slidably supported at the other end of the ramp on the next lower tweendeck whereby said other end of the ramp is automatically displaced into said opening when said lower tweendeck is lifted and is automatically displaced downwardly from said opening when said lower tweendeck is lowered, said ramp having a sub-ramp hinged to said ramp adjacent said other end for limited pivotal movement, the free end of said sub-ramp having rollers slidably supporting the ramp on said lower tweendeck, and an extension pivoted to the free end of the sub-ramp which may be folded out after lowering and folded in prior to lifting said lower tweendeck.

\* \* \* \* \*